UNITED STATES PATENT OFFICE.

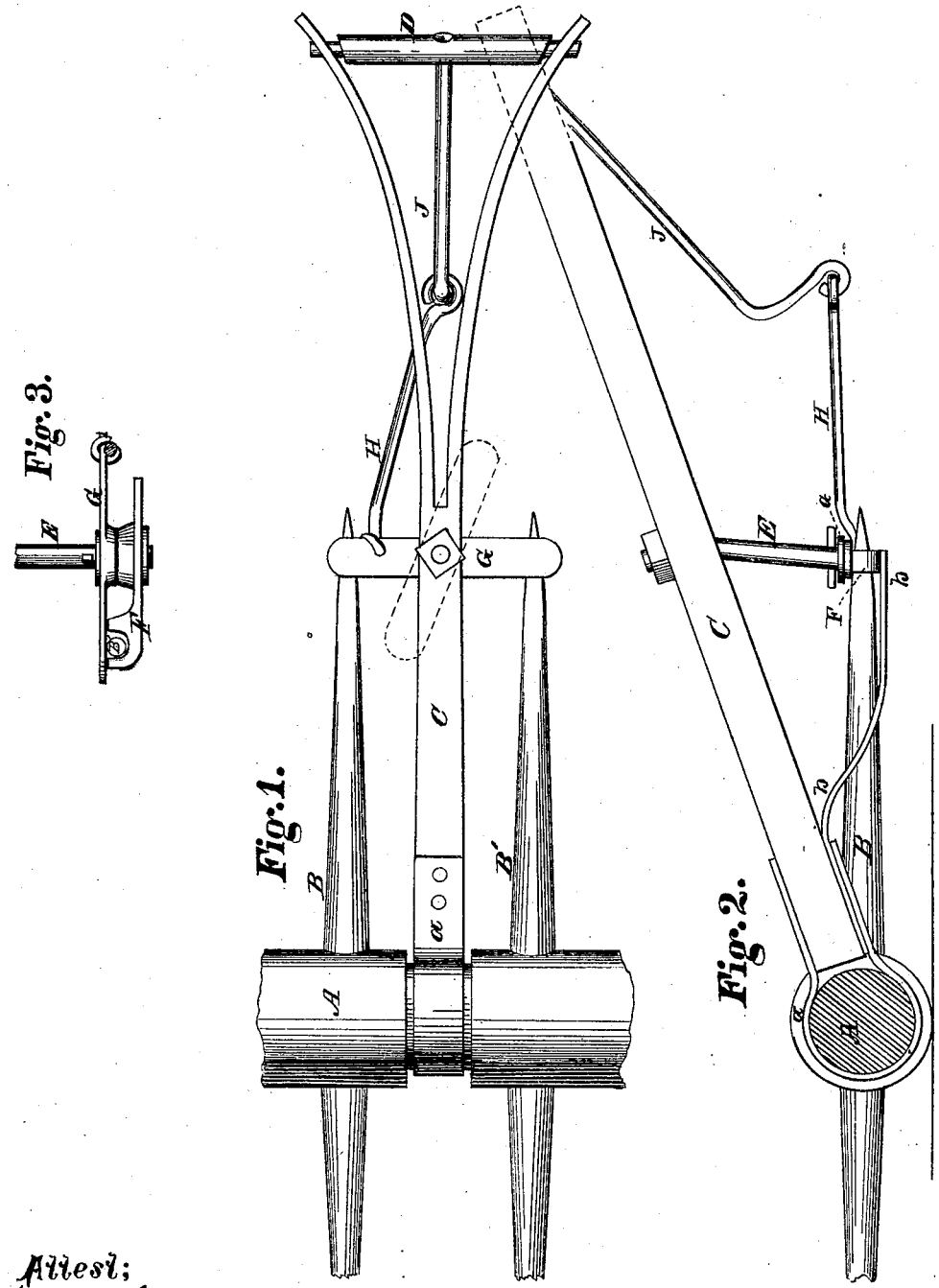

ROBERT S. RYKER, OF CANAAN, INDIANA.

IMPROVEMENT IN HORSE HAY-RAKES.

Specification forming part of Letters Patent No. 131,183, dated September 10, 1872; antedated September 5, 1872.

Specification describing certain Improvements in Revolving Horse Hay-Rakes, invented by ROBERT S. RYKER, of Canaan, in the county of Jefferson and State of Indiana.

This invention relates to a device for controlling the rake-head, which is one of the ordinary revolving kind.

Figure 1 is a plan of my invention. Fig. 2 is a side elevation of the same. Fig. 3 is a detached rear elevation of the securing and disengaging device.

Like letters of reference designate corresponding parts in all the figures.

A is the central portion of the rake-head, and B B' are the two central teeth. C is the handle, attached to the revolving head by a metallic strap, a, in the usual manner. The handle is forked for a portion of its length, and is provided with a roller, D, to grasp with the hands. From the handle C depends a rod, E, to the foot of which is secured a cross-piece, which I will call the hook-bar F, as it is provided with a hook at one end for the reception of the tooth B', which it engages near the point. This bar receives support from a curved shoe-plate, b, which is connected with the handle near the rake-head, as shown in Fig. 2. A cross-plate, G, arranged to oscillate horizontally on the rod E as a center, extends across the two central teeth B B', as seen in Fig. 1. This rod is connected by two bent and linked rods, H J, with the roller D, to which the latter rod is secured.

The operation is as follows: In revolving the rake the operator grasps the roller firmly and lifts upward. This movement naturally revolves the roller backward, which communicates a revolving or oscillating motion to the plate G, and it assumes the position shown by the dotted lines, thus releasing the teeth and allowing the rake-head to revolve. The hook in the bar F, being under the tooth B, enables the operator to start the rake over by lifting up on the rear points of the teeth. The handle must have sufficient lateral play by the loose fitting of the strap a around the head to enable the operator to catch the hook under the tooth again after the revolution has been accomplished. The operation of bringing the handle C down to its original position also replaces the plate G, and the rake is again completely under the control of the operator, the point of the tooth B being completely surrounded, as seen in Fig. 3.

Having thus described my invention, what I claim as new is—

The device consisting of the cross-plate G, rods H and J, roller D, and hook-bar F, when arranged in the manner substantially as shown, and for the purposes specified.

Witness my hand this 23d day of January, 1872.

ROBERT S. RYKER.

Attest:
HENRY CONNETT, Jr.,
JOSEPH H. RYKER.